(12) United States Patent
Mittal et al.

(10) Patent No.: US 12,182,251 B2
(45) Date of Patent: Dec. 31, 2024

(54) WEB-BASED AUTHENTICATION FOR DESKTOP APPLICATIONS

(71) Applicant: Landis+Gyr Innovations, Inc., Alpharetta, GA (US)

(72) Inventors: Narinder Mittal, Noida (IN); Pushpesh Kumar Deshmukh, Alpharetta, GA (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 353 days.

(21) Appl. No.: 17/708,331

(22) Filed: Mar. 30, 2022

(65) Prior Publication Data

US 2023/0315830 A1    Oct. 5, 2023

(51) Int. Cl.
*G06F 21/44*    (2013.01)
*G06F 9/54*    (2006.01)

(52) U.S. Cl.
CPC .............. *G06F 21/44* (2013.01); *G06F 9/547* (2013.01)

(58) Field of Classification Search
CPC ................................. G06F 21/44; G06F 9/547
See application file for complete search history.

(56) References Cited

U.S. PATENT DOCUMENTS

| | | | | |
|---|---|---|---|---|
| 9,948,612 | B1 * | 4/2018 | Jawahar | ............. H04L 63/0272 |
| 10,511,590 | B1 * | 12/2019 | Bosch | ..................... H04L 63/20 |
| 10,764,752 | B1 * | 9/2020 | Avetisov | ............. H04L 63/0823 |
| 11,201,866 | B1 * | 12/2021 | Specht | .................... H04L 67/02 |
| 11,651,357 | B2 * | 5/2023 | Kumar | ................ H04L 63/0838 |
| | | | | 705/73 |
| 11,853,463 | B1 * | 12/2023 | Hinrichs | ............... G06F 21/629 |
| 11,870,767 | B1 * | 1/2024 | Natarajan | ............... H04L 47/70 |
| 2012/0151568 | A1 * | 6/2012 | Pieczul | .............. H04L 63/0815 |
| | | | | 726/8 |

(Continued)

OTHER PUBLICATIONS

Kohler et al., FACIUS: An Easy-to-Deploy SAML-based Approach to Federate Non Web-Based Services, IEEE 11th International Conference on Trust, Security and Privacy in Computing and Communications, Jun. 2012, pp. 557-564.

(Continued)

*Primary Examiner* — Jason Chiang
(74) *Attorney, Agent, or Firm* — Kilpatrick Townsend & Stockton LLP (57) ABSTRACT

In one implementation, a system includes a web application and a desktop application, where the web application acts as an intermediary between the desktop application and an identity server. The desktop application loads a browser control to navigate an internal browser of the desktop application to the web application, and the web application redirects the internal browser to the identity server. The desktop application submits, via the internal browser, user credentials to authenticate a user of the desktop application to the identity server. The desktop application receives, at the internal browser, a cookie including an access token for the user of the desktop application. The desktop application transmits, to a web application programming interface (API) associated with the web application, an authentication request including the access token. The desktop application grants access to a resource of the desktop application based on an indication of authentication received from the web API.

20 Claims, 4 Drawing Sheets

(56) References Cited

U.S. PATENT DOCUMENTS

| | | | | |
|---|---|---|---|---|
| 2016/0269392 | A1* | 9/2016 | Arumugam | H04L 63/083 |
| 2016/0366121 | A1* | 12/2016 | Rykowski | H04L 63/0815 |
| 2017/0180351 | A1* | 6/2017 | Lu | H04L 67/146 |
| 2018/0152440 | A1* | 5/2018 | Hande | H04L 63/0815 |
| 2018/0337914 | A1* | 11/2018 | Mohamad Abdul | H04L 9/3213 |
| 2019/0065704 | A1* | 2/2019 | Giffard-Burley | H04L 63/0823 |
| 2019/0103968 | A1* | 4/2019 | Srinivasan | H04L 9/0894 |
| 2019/0289005 | A1 | 9/2019 | Shtivi et al. | |
| 2019/0394032 | A1* | 12/2019 | Vudathu | H04L 63/0428 |
| 2020/0104478 | A1* | 4/2020 | Chauhan | G06F 21/45 |
| 2020/0145385 | A1* | 5/2020 | Chauhan | H04L 63/0281 |
| 2020/0153818 | A1* | 5/2020 | Chauhan | H04L 63/20 |

OTHER PUBLICATIONS

Patterson et al., Federated Identity: Single Sign-On Among Enterprises, Available Online at: http://developers.sun.com/identity/reference/techart/federated.html, Oct. 14, 2004, pp. 1-10.
International Application No. PCT/US2022/022479, International Search Report and the Written Opinion mailed on Nov. 9, 2022, 12 pages.

* cited by examiner

WEB-BASED AUTHENTICATION FOR DESKTOP APPLICATIONS

TECHNICAL FIELD

Some implementations described herein relate to computer applications and, more specifically, to facilitating authentication of users to desktop applications using a web-based identity server.

BACKGROUND

Security Assertion Markup Language (SAML) is an open standard for exchanging authentication data between entities. For instance, SAML is often used to authenticate users to web applications associated with service providers. A service provider is an entity that provides a service, such as a utility. A service provider can be associated with a web application, such as one useable by a customer of the service provider to check an account or useable by an employee to perform maintenance tasks. If the web application requires user authentication, then the web application can communicate with an identity server of an identity provider. An identity provider is an entity that provides an authentication service. Using SAML, the web application exchanges communications with the identity server to authenticate a user of the web application. A benefit of using SAML, and thus being able to exchange messages with the identity server, is that the service provider need not implement its own authentication service, and additionally, a given identity server can be used to authenticate users to multiple web applications, which is convenient for users.

SUMMARY

In one implementation, a desktop application performs aspects of a method for authenticating a user. According to the method, while installed and running on a client device, the desktop application identifies a web application configured to act as an intermediary between the desktop application and an identity server. The desktop application loads a browser control to navigate an internal browser of the desktop application to the web application, and the web application redirects the internal browser to the identity server. The desktop application submits, via the internal browser, user credentials to authenticate a user of the desktop application to the identity server. At its internal browser, the desktop application receives a cookie including an access token for the user of the desktop application. The desktop application transmits, to a web application programming interface (API) associated with the web application, an authentication request including the access token. Based on an indication of authentication received from the web API, the desktop application grants access to a resource of the desktop application.

In another implementation, a web application performs aspects of a method for authenticating a user. According to the method, the web application receives a connection from an internal browser running in a desktop application of a client device. The web application redirects the internal browser of the desktop application to an identity server, and the web application acts as an intermediary between the desktop application and the identity server. The web application receives an indication of successful authentication to the identity server of a user at the desktop application. As such, the web application returns, to the internal browser of the desktop application, a cookie including an access token confirming authorization of the user at the desktop application. A web API associated with the web application receives, from the desktop application, an authentication request comprising the access token, and the web API authenticates the user to the desktop application, based on the access token.

In yet another implementation, a system configured to authenticate users to desktop applications includes a web application and a desktop application. The web application is configured to act as an intermediary between desktop applications and an identity server for authenticating users of the desktop applications. The desktop application identifies the web application as the intermediary between the desktop application and the identity server. The desktop application loads a browser control to navigate an internal browser of the desktop application to the web application, and the web application redirects the internal browser to the identity server. The desktop application submits, via the internal browser, user credentials to authenticate a user of the desktop application to the identity server. The desktop application receives, at the internal browser, a cookie including an access token for the user of the desktop application. The desktop application transmits, to a web API associated with the web application, an authentication request including the access token. The desktop application grants access to a resource of the desktop application based on an indication of authentication received from the web API.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Although Security Assessment Markup Language (SAML) provides convenience for both service providers and end users, a significant drawback of SAML is that it is typically limited to use with web applications. Many web applications support SAML by incorporating, into their code, configurations required for communications in SAML. In contrast, desktop applications are not typically designed to use SAML, so each existing desktop application that could potentially use an identity provider for authentication would need to be updated with proper configurations in order to utilize SAML. Without such configurations, many desktop applications are severely limited in terms of their authentication options.

Some implementations described herein, however, facilitate authentication of users to desktop applications using an identity provider. For instance, a desktop application can utilize a browser control to communicate with a web application, such that the web application communicates with an identity server, using SAML, on behalf of the desktop application. Further, in some implementations, a web application programming interface (API) associated with the web application can generate a temporary password to enable authentication of the user in offline mode. As a result, the desktop application can authenticate a user, through SAML in combination with an identity server, in both online mode and offline mode. A further benefit of some implementations is extensibility, in that the desktop application could be configured to use a different authentication technique or a different identity provider simply by being directed to a different web application configured to facilitate the authentication desired.

Figure 1:
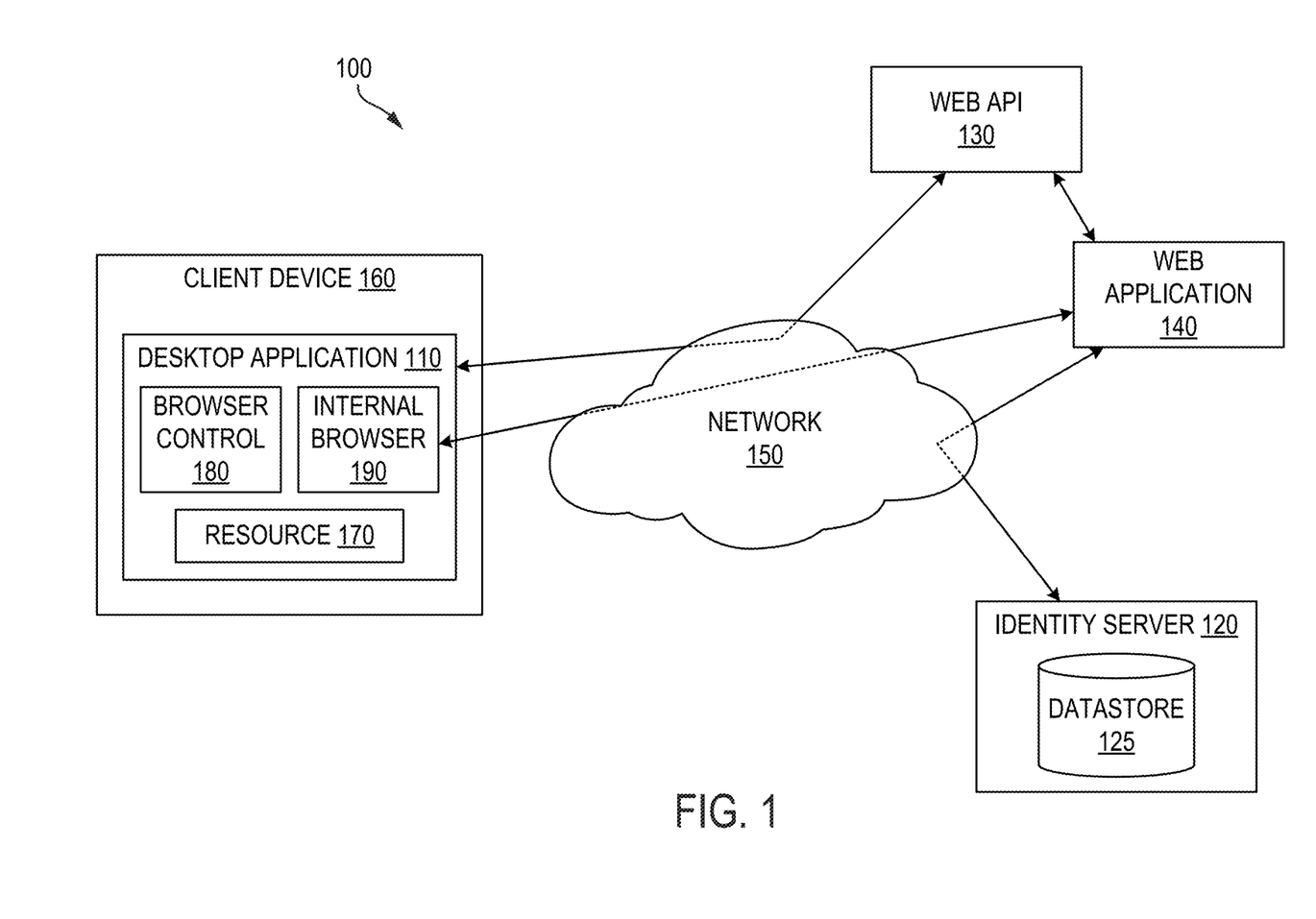
FIG. 1 is a diagram of an authentication system for authenticating a user to a desktop application, according to some implementations described herein.

FIG. 1 is a diagram of an authentication system 100, according to some implementations described herein. The authentication system 100 may include a desktop application 110, an identity server 120, a web API 130, and a web application 140 associated with the web API 130, each of which may be connected to a network 150. The desktop application 110, the identity server 120, the web API 130, and the web application 140 may communicate with one another as needed or as described herein to enable the desktop application 110 to authenticate a user. The authentication system 100 may enable the desktop application 110 to authenticate a user of the desktop application 110, through the use of SAML to communicate with an identity server 120. In some implementations, the desktop application is not configured to support SAML. However, the web application 140 may act as an intermediary between the desktop application 110 and the identity server 120 to facilitate the authentication.

The desktop application 110 may be installed on a client device 160, which may be a computing device such as a desktop computer, notebook computer, tablet, or smartphone. The desktop application 110 may be a software program, or portion of a software program, executable by a processor of the client device 160 such that the desktop application 110 runs on the client device 160. For instance, the desktop application 110 is a thick client application.

In some implementations, the desktop application 110 is associated with a service provider. For instance, the service provider is a utility provider, and the desktop application 110 is a program used by field technicians of the utility provider to manage and track maintenance of utility meters. However, various other types of desktop applications 110 are within the scope of this disclosure. The desktop application 110 may require user authentication such that a resource 170 of the desktop application, such as data or a service provided by the desktop application 110, is not accessible to a user until the user authenticates himself to the desktop application 110.

In some implementations, the desktop application 110 is configured to execute a browser control 180 to provide an internal browser 190 in the desktop application 110. For instance, the browser control 180 may provide controls, such as navigation controls, that enable web browsing functionality of the internal browser 190 in the desktop application 110. In other words, the browser control 180 may be a browser wrapper for the desktop application 110. Because the internal browser 190 is part of the desktop application 110, in some implementations, the internal browser 190 does not have the configurations needed to support SAML. Thus, in some implementations, the internal browser 190 is not capable of communicating directly with the identity server 120 to authenticate a user. However, as described herein, the internal browser 190 can communicate with the web application 140 to facilitate user authentication.

The identity server 120 may be configured to authenticate users by verifying the identities of users. More specifically, the identity server 120 can authenticate that a user's identity, based on user credentials entered by the user, matches the identity of a user associated with a user account on the identity server 120. The identity server 120 may be a server associated with an identity provider. Through the identity server 120, the identity provider may confirm the identity of users and may thus authenticate users to various applications. Those applications may be web applications, desktop applications, or a combination of both. The identity server 120 may be implemented as hardware, software, or a combination of both. The identity server 120 may be implemented on a computing device or distributed across two or more computing devices. For instance, the identity server 120 may be implemented as program code executed on one or more processors of one or more computing devices. In some implementations, the identity server 120 operates in a cloud and is accessible over the internet.

The identity server 120 may include or have access to a datastore 125, which maintains information about users having user accounts with the identity server 120. The datastore 125 may be one or more databases, database tables, text files, or other storage objects stored in a storage device of the identity server 120. For instance, each user account may be represented as a table row in the datastore 125. In some implementations, a user account includes user data related to a respective user, where that user data includes authentication data used to authenticate the user associated with the user account.

For instance, the authentication data in a user account of a user may include a user identifier and a password. The user identifier may uniquely identify the user; for instance, the user identifier is an email address, password, phone number, Internet Protocol (IP) address, media access control (MAC) address, or other data. The password may be stored in the datastore 125 in a form that is encrypted, hashed, or otherwise concealed. In some implementations, such as if the identity server 120 supports biometric data, the authentication data in the user account may additionally or alternatively include a representation of a biometric factor, which may be hashed or otherwise concealed, of the user. When the user account is initially established or updated, the identity server 120 may receive the authentication data, such as through manual entry by the user or an administrator. The identity server 120 may then maintain this authentication data in the datastore 125 for use in authenticating the user as described herein.

The identity server 120 may be configured to communicate with applications using SAML. In some implementations, the identity server 120 is not capable of communicating directly for authentication purposes with certain desktop applications or web applications that do not support SAML. Further, in some implementations, the desktop application 110 described herein need not support SAML. The web application 140 may manage authentication of users for the desktop application 110 by communicating with the desktop application 110 and, further, by using SAML to communicate with the identity server 120. Although this disclosure refers repeatedly to the use of SAML in particular, various implementations could use some other security communication protocol. Thus, the implementations described herein are not limited to SAML as the security communication protocol of the identity server 120, but rather, references herein to SAML in particular are made for illustrative purposes only.

The web application 140 may be configured to act as an intermediary between the desktop application 110 and the identity server 120 to authenticate users for the desktop application 110. In some implementations, the web application 140 is implemented as hardware, software, or a combination of both. For instance, the web application 140 is implemented as program code stored on a storage device and executable by one or more processors. The web application 140 may run on-premises, such as at a site associated with a service provider associated with the desktop application 110, or may operate in a cloud. In some implementations, the web application 140 is configured to communicate with the identity server 120 using SAML. For instance, the program code of the web application 140 includes instructions for parsing and constructing SAML statements. As such, the web application 140 is configured to exchange messages with the identity server 120 for authentication purposes.

In some implementations, the web API 130 is an application programming interface exposed to the desktop application 110. The web API 130 may behave as an interface for the desktop application 110 to perform certain interactions with the web application 140 or with other resources on the web. In some implementations, the web API 130 is implemented as hardware, software, or a combination of both. The web API 130 may run on-premises, such as at a site associated with a service provider associated with the desktop application 110, or may operate in a cloud. In some implementations, the web API 130 is integrated with the web application 140, or the web API 130 executes on the same one or more computing devices as does the web application 140. Additionally or alternatively, however, the web API 130 may run on a distinct device from the web application 140 and may communicate with the web application 140 over the network 150 or via other means.

In some implementations, each of the web application 140, the web API 130, and the identity server 120 may facilitate authentication for multiple desktop applications. In that case, each desktop application configured to use the authentication system 100 as described herein may have access to the web API 130 and the web application 140 and may perform operations similar to those described as performed by the desktop application 110 described herein. Thus, although this disclosure refers repeatedly to operations involving the desktop application 110, in the singular, the authentication system 100 may authenticate users for various desktop applications 110, and such authentications may occur in parallel such that the web application 140, the web API 130, and the identity server 120 can facilitate authentication for multiple desktop applications 110 at a given time.

In some implementations, the desktop application 110, the web application 140, the web API 130, and the identity server 120 communicate with one another over the network 150. The network 150 may be a combination of one or more local area networks or wide area networks, using wired communications systems, wireless communication systems, or a combination thereof. Each of the client device 160, the web application 140, the web API 130, and the identity server 120 may have direct or indirect access to the network 150 via a respective network interface device.

Figure 2:
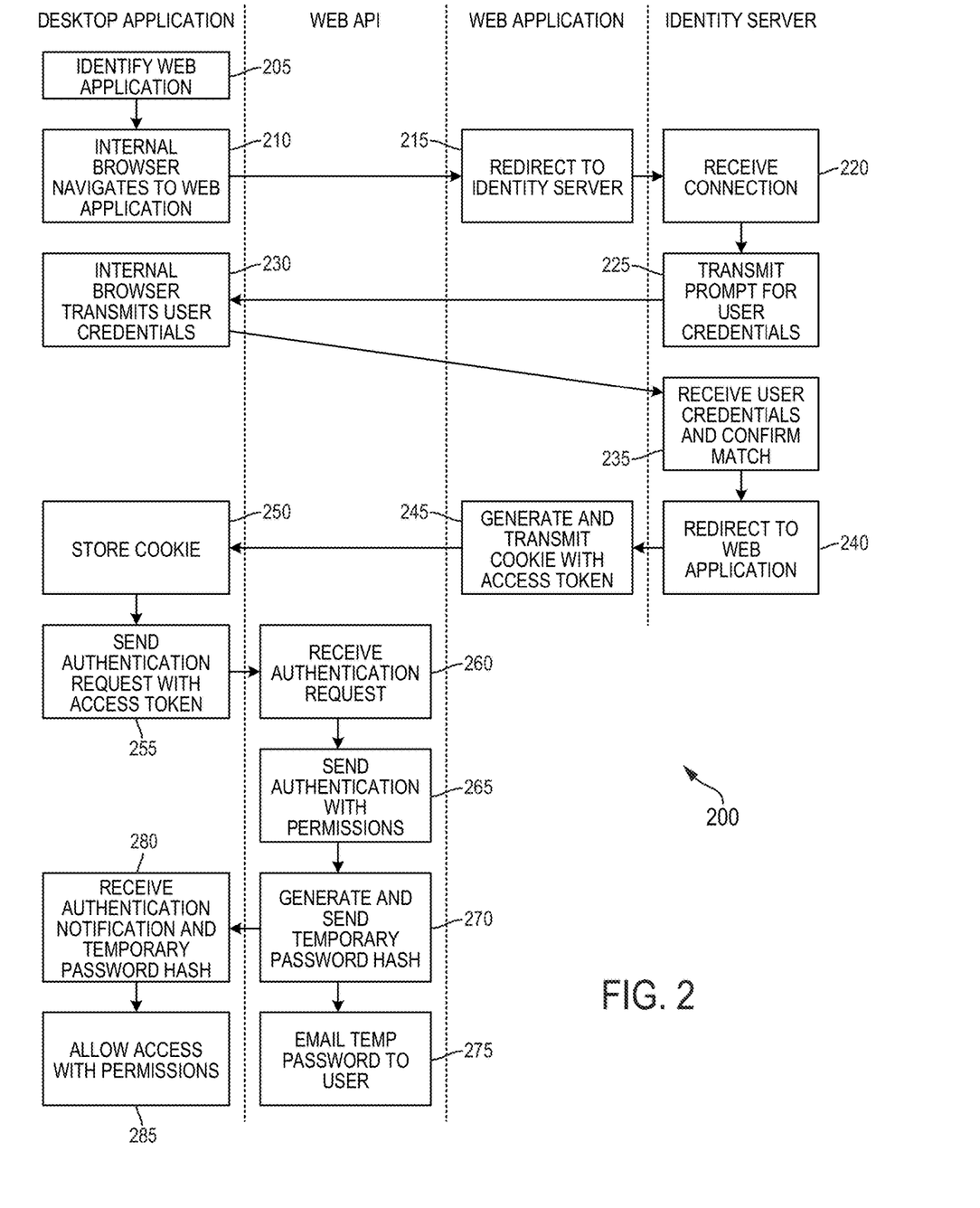
FIG. 2 is a flow diagram of a method of authenticating the user to the desktop application, according to some implementations described herein.

FIG. 2 is a flow diagram of a method 200 of authenticating a user to the desktop application 110, according to some implementations described herein. In some implementations, components of the authentication system 100 perform this method 200 or similar when the desktop application 110 starts up on the client device 160. In FIG. 2, the flow diagram is sectioned across the horizontal axis into four vertical areas, each of which represents operations performed by a corresponding component of the authentication system 100. However, the assignment of operations to certain components is provided for illustrative purposes only and does not limit the various possible implementations of the authentication system 100.

The method 200 depicted in FIG. 2 may be implemented in software executed by one or more processors of a computer system, implemented in hardware, or implemented in a combination of software and hardware. The method 200 presented in FIG. 2 and described below is intended to be illustrative and non-limiting. Although FIG. 2 depicts various processing operations occurring in a particular sequence or order, this is not intended to be limiting. In certain alternative examples, the processing may be performed in a different order, operations may be excluded or added, or some operations may be performed in parallel.

Prior to block 205, the desktop application 110 may determine whether it can reach the web API 130, which is required for online authentication in some implementations. For instance, the desktop application 110 may be unable to reach the web API 130 if the client device 160 on which the desktop application 110 runs is not connected to the network 150 or, otherwise, if the desktop application 110 does not have network access. If the desktop application 110 cannot reach the web API 130, then the desktop application may execute a method 300 for authentication in offline mode, such as the method 300 described in FIG. 3. However, if the desktop application 110 can reach the web API 130, then the desktop application 110 may proceed with this method 200 in online mode.

As shown in FIG. 2, at block 205, the desktop application 110 identifies a web application 140 configured to act as an intermediary between the desktop application 110 and an identity server 120. To this end, the desktop application 110 may request authentication settings needed for authentication; for instance, the desktop application 110 may request such authentication settings from the web API 130. In response to the request, the web API 130 may return the authentication settings.

The authentication settings may identify the web application 140 to the desktop application 110. In some examples, the authentication settings explicitly provide a location, such as a uniform resource locator (URL) or IP address, of the web application 140 to be used for authentication. Additionally or alternatively, in some examples, the desktop application 110 maintains a mapping of security communication protocols to web applications, and the desktop application 110 knows the locations of such web applications. In that case, the authentication settings may indicate a security communication protocol, such as SAML, and the desktop application 110 may map that security communication protocol to a location of the web application 140. Various implementations are possible and are within the scope of this disclosure.

At block 210, the desktop application 110 loads a browser control 180 to navigate an internal browser 190 of the desktop application 110 to the web application 140 identified at block 205. At block 215, the web application 140 may redirect the internal browser 190 of the desktop application 110 to the identity server 120. In some implementations, the web application 140 includes program code indicating a location, such as an URL or IP address, of the identity server 120, and thus, the web application 140 can redirect the internal browser 190 to that location.

At block 220, the identity server 120 receives a connection from the internal browser 190 of the desktop application 110. Specifically, the connection may be a result of the internal browser 190 having been redirected to the identity server 120 by the web application 140. Thus, at block 225, the identity server 120 transmits to the internal browser 190 of the desktop application 110 a prompt to provide user credentials. In some implementations, the prompt is displayed via the internal browser of the desktop application 110 to a user, and the user enters the user's credentials into the internal browser 190.

At block 230, the desktop application 110, via the internal browser 190, transmits the user credentials to the identity server 120. At block 235, the identity server 120 receives the user credentials and confirms the user's identity. More specifically, the identity server 120 may confirm that the user credentials received match those in authentication data of a user account stored in the datastore 125 of the identity server 120. However, if the user credentials do not match authentication data stored in the datastore 125, the identity server 120 may once again transmit a prompt for user credentials or may indicate that authentication has failed.

If the user credentials are valid (i.e., matching authentication data of a user account), then at block 240, the identity server 120 redirects the internal browser 190 back to the web application 140. Then at block 245, the web application 140 generates a cookie (e.g., a block of data) including an access token and transmits that cookie to the internal browser 190 of the desktop application. In some implementations, the access token is encrypted to ensure that the access token cannot be stolen and used by a different user to access the desktop application 110. The access token may be or include identifying data that confirms authentication and uniquely identifies a session between the user and the desktop application 110. For instance, the access token may include a random string unique to the session. Conventionally, after authentication of a user to a web application, the web browser would couple communications from the client side with metadata including the access token, to confirm the authenticity of such communications. In some implementations, however, the access token is utilized by the desktop application 110 without additional operations of the internal browser 190 (e.g., after the internal browser 190 is closed) as described further below.

At block 250, the desktop application 110 stores the cookie locally. In some implementations, the desktop application 110 may then close the internal browser 190. At block 255, the desktop application 110 transmits an authentication request to the web API 130. In some implementations, the desktop application 110 transmits the access token, which may be encrypted, to the web API 130 as part of the authentication request.

At block 260, the web API 130 receives the authentication request, including the access token. The web API 130 may be configured to authenticate access tokens, such as by verifying the authenticity of access tokens. Further, the web API 130 may maintain, or have access to, a mapping of users to permissions for the desktop application 110. Given the access token, which may include a user identifier that identifies the user, the web API 130 may thus authenticate the access token and determine permissions associated the user. At block 265, the web API 130 transmits to the desktop application 110 an authentication notification indicating that the user is authenticated with specific permissions. The authentication notification may indicate the specific permissions applicable to the user with respect to the desktop application 110, such as which resources 170 the user is allowed to read and which resources 170 the user is allowed to write.

At block 270, the web API 130 generates a temporary password for the user of the desktop application 110 and transmits a representation of the temporary password, such as a hash of the temporary password, to the desktop application. At block 275, the web API 130 also sends the temporary password to the user, such as via email, so the user has the temporary password. As described in more detail below, the temporary password may enable the user to log into the desktop application 110 in offline mode.

At block 280, the desktop application 110 receives the authentication notification and the representation of the temporary password. The desktop application 110 may store the representation of the temporary password locally. In some implementations, the client device 160 includes a secure storage device, such as an encrypted drive, and the desktop application 110 causes the client device 160 to store the representation of the temporary password on the secure storage device.

At block 285, the desktop application 110 allows the user access to the resource 170 according to the specific permissions indicated in the authentication notification received at block 280. For instance, the desktop application 110 displays a user interface through which the user can access the resource 170 or perform other activities available through the desktop application 110 with the specific permissions provided. In some implementations, this begins a session between the user and the desktop application 110.

Generally, in some implementations, the session is a limited period of time during which the user interacts with the desktop application 110 without having to re-authenticate. Later, the desktop application 110 may terminate the session, for instance, responsive to the user logging out or automatically after a period of inactivity of the user reaches a certain time length. After termination of the session, the user may need to re-authenticate to again access the resource 170 of the desktop application 110, and that re-authentication can be done as described above or using the temporary password.

In some implementations, the communications described above that occur among the desktop application 110, the web API 130, and the web application 140 may be transparent to the user. For instance, the user opens the desktop application 110, sees the prompt for user credentials, enters the user credentials, receives an email indicating the temporary password for offline login, and is permitted access to the resource 170. The user need not be aware of the various other operations involved in the method 200 of authentication.

As discussed above, the desktop application 110 can provide or restrict access to a resource 170, such as certain data or services. In some cases, a user may require access to that resource 170 in a place where the desktop application 110 cannot reach the web API 130 over the network 150. For instance, the desktop application 110 may not have network access at all times. In one example, the client device 160 is a mobile device, and a user who is a field technician requires use of the desktop application 110 when out in the field. In this example, the resource 170 accessible to the desktop application 110 could be information about activities required to be performed by the field technician. However, network access may not always be available to the desktop application 110 when operated in the field.

Some implementations of the desktop application 110 utilize the temporary password, discussed above with reference to blocks 270-280, to facilitate user authentication in an offline mode. Each temporary password may be associated with an expiration time. Before the expiration time arrives, the temporary password remains valid for authentication in offline mode. However, when the expiration time for a password arrives, the temporary password expires, thus becoming invalid, and can no longer be used for authentication.

Figure 3:
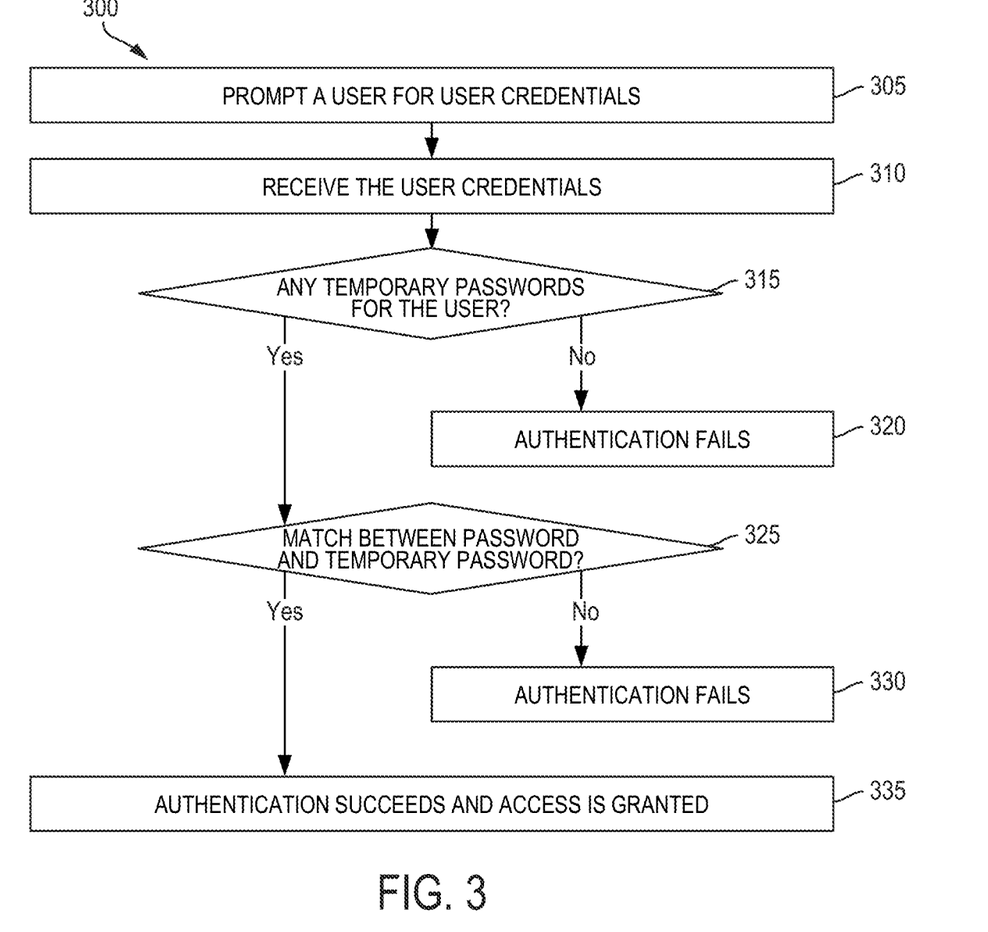
FIG. 3 is a flow diagram of a method of authenticating the user to the desktop application in offline mode, according to some implementations described herein.

FIG. 3 is a flow diagram of a method 300 of authenticating a user to the desktop application 110 in offline mode, according to some implementations described herein. In some implantations, the desktop application 110 performs this method 300 or similar when the desktop application 110 starts up on the client device 160 and detects that the web API 130 is unreachable. In that case, the desktop application 110 may proceed to this method 300 for authentication in offline mode.

The method 300 depicted in FIG. 3 may be implemented in software executed by one or more processors of a computer system, implemented in hardware, or implemented in a combination of software and hardware. The method 300 presented in FIG. 3 and described below is intended to be illustrative and non-limiting. Although FIG. 3 depicts various processing operations occurring in a particular sequence or order, this is not intended to be limiting. In certain alternative examples, the processing may be performed in a different order, operations may be excluded or added, or some operations may be performed in parallel.

As shown in FIG. 3, at block 305, the desktop application 110 prompts a user for user credentials. For instance, the desktop application 110 presents to the user a user interface, which includes input elements where the user can type and submit, or otherwise enter, the user credentials. In some examples, the user credentials include a user identifier and a password. At block 310, the desktop application 110 receives the user credentials entered by the user in response to the prompt.

At decision block 315, the desktop application 110 determines whether any temporary password associated with the user (e.g., associated with the entered user identifier) is stored on the client device 160 and valid for offline authentication. For instance, a temporary password could be deemed valid if the temporary password has not yet expired, and a temporary password could be deemed invalid after its expiration. If no such valid temporary password is found, then at block 320, authentication fails. The desktop application 110 may present a notification, such as via the user interface, that authentication in offline mode is not available or has failed. In that case, the desktop application 110 may restrict or disallow access to the resource 170 available through the desktop application 110.

However, if at least one temporary password that is valid is found for the user on the client device 160, then at decision block 325, the desktop application 110 compares that temporary password to the password entered by the user as part of the user credentials. As discussed above, the client device 160 may maintain a hash of the temporary password, rather than the temporary password itself. In that case, the desktop application 110 may hash the password received at block 310 and may compare the hash to the hash of the temporary password to determine whether the password received and the temporary password match.

If the password received does not match the temporary password, then at block 330, authentication fails because the user credentials received are invalid. In that case, the desktop application 110 may indicate, such as via the user interface, that authentication has failed. The desktop application 110 may restrict or disallow access to the resource 170 available through the desktop application 110 until the user enters valid user credentials. In some implementations, the desktop application 110 may allow the user one or more additional attempts to provide valid user credentials.

However, if the password received at block 310 matches the temporary password associated with the user, then at block 335, the desktop application 110 deems the user to be authentic. As such, the desktop application may allow the user to use the desktop application 110 to access the resource 170 or to perform other activities.

Figure 4:
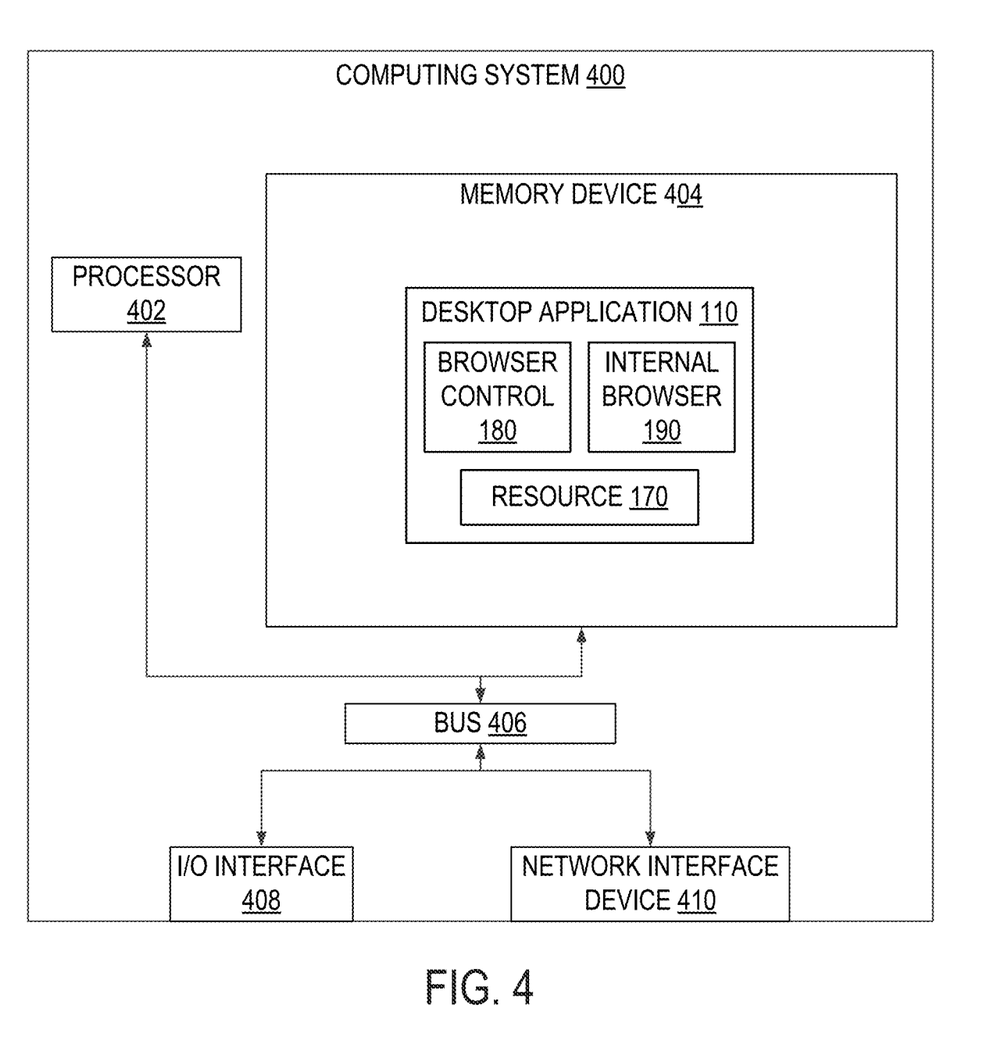
FIG. 4 is a diagram of an example of a computing system that can perform certain operations described herein.

FIG. 4 is a diagram of an example of a computing system 400 that can perform certain operations described herein. For instance, a computing system 400 similar to that shown in FIG. 4 can be a client device 160 configured to run the desktop application 110, the computing system 400 can run the web application 140 and the web API 130, or the computing system 400 can be or can execute the identity server 120. Various suitable computing systems or groups of computing systems can be used for performing the operations described herein.

For example, FIG. 4 shows an example of a computing system 400 that acts as the client device 160 and executes the desktop application 110. The depicted example of the computing system 400 includes a processor 402 communicatively coupled to one or more memory devices 404. The processor 402 executes computer-executable program code stored in a memory device 404. Examples of the processor 402 include a microprocessor, an application-specific integrated circuit (ASIC), a field-programmable gate array (FPGA), or another suitable processing device. The processor 402 can include one or more processing devices.

The memory device 404 includes a suitable non-transitory computer-readable medium for storing data, program code, or both. A computer-readable medium can include an electronic, optical, magnetic, or other storage device capable of providing a processor with computer-readable instructions or other program code. Non-limiting examples of a computer-readable medium include a magnetic disk, memory chip, read-only memory (ROM), random-access memory (RAM), optical storage, magnetic tape or other magnetic storage, or another medium from which a processing device can read instructions.

In some implementations, the computing system 400 executes program code that configures the processor 402 to perform one or more of the operations described herein. The program code includes, for example, instructions for implementing the desktop application 110 or other suitable systems that perform one or more operations described herein. The program code may be resident in the memory device 404 or a suitable computer-readable medium and may be executed by the processor 402 or other suitable processor. Although not shown in FIG. 4, a memory device 404 of the same or a different computing system 400 may include program code for the web application 140 or the web API 130, or both.

The computing system 400 may include one or more external or internal devices, such as input or output devices. For example, the computing system 400 is shown with one or more input/output ("I/O") interfaces 408. One or more buses 406 are also included in the computing system 400. The bus 406 communicatively couples one or more components of the computing system 400.

An implementation of the computing system 400 includes a network interface device 410. The network interface device 410 includes one or more devices suitable for establishing a wired or wireless data connection to one or more data networks, such as the network 150. Non-limiting examples of the network interface device 410 include an Ethernet network adapter or a Wireless Fidelity (WiFi) card. The computing system 400 is able to communicate with one or more other computing devices via a data network using the network interface device 410. For example, the computing system 400 running the desktop application 110 can use the network interface device 410 to communicate with the web application 140 and the web API 130 over the network 150.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
    identifying, by a desktop application installed and running on a client device, a web application configured to act as an intermediary between the desktop application and an identity server;
    loading, by the desktop application, a browser control to navigate an internal browser of the desktop application to the web application, wherein the web application redirects the internal browser to the identity server;
    submitting, by the desktop application via the internal browser, user credentials to authenticate a user of the desktop application to the identity server;
    receiving, at the internal browser of the desktop application, a cookie comprising an access token for the user of the desktop application;
    transmitting, by the desktop application, to a web application programming interface (API) associated with the web application, an authentication request comprising the access token; and
    granting access to a resource of the desktop application, based on an indication of authentication received from the web API.

2. The method of claim 1, further comprising:
    receiving, by the desktop application, a hash of a temporary password generated by the web API; and
    storing the hash of the temporary password on the client device to enable offline authentication of the user to the desktop application.

3. The method of claim 2, further comprising:
    terminating a session between the user and the desktop application;
    receiving, at the desktop application, an entered password; and
    granting access to the resource of the desktop application based on matching the entered password to the hash of the temporary password generated by the web API.

4. The method of claim 1, wherein identifying the web application comprises:
    requesting that the web API provide settings related to the identity server to authenticate the user of a desktop application installed and running on the client device; and
    receiving, by the desktop application, from the web API, an indication of the web application acting as an intermediary between the desktop application and the identity server.

5. The method of claim 4, further comprising:
    receiving, by the desktop application, an indication of a security communication protocol for communicating with the identity server; and
    identifying the web application as having a capability of using the security communication protocol.

6. The method of claim 4, further comprising:
    receiving, by the desktop application, an indication that Security Assertion Markup Language (SAML) is used for communications with the identity server; and
    identifying the web application as having a capability of using SAML to communicate with the identity server.

7. A method comprising:
    receiving, at a web application, a connection from an internal browser running in a desktop application of a client device;
    redirecting, by the web application, the internal browser of the desktop application to an identity server, wherein the web application acts as an intermediary between the desktop application and the identity server;
    receiving, by the web application, an indication of successful authentication to the identity server of a user at the desktop application;

returning, by the web application, to the internal browser of the desktop application, a cookie comprising an access token confirming authorization of the user at the desktop application;

receiving, from the desktop application, an authentication request comprising the access token; and authenticating the user to the desktop application, based on the access token.

8. The method of claim 7, further comprising:

generating a temporary password for an offline mode of the desktop application; and transmitting to the desktop application a hash of the temporary password to enable offline authentication of the user to the desktop application.

9. The method of claim 7, further comprising:

receiving, by a web application programming interface (API) associated with the web application, an authentication settings request from the desktop application; and transmitting to the desktop application an indication of the web application, responsive to the authentication settings request.

10. The method of claim 7, further comprising communicating, by the web application, with the identity server using Security Assertion Markup Language on behalf of the desktop application.

11. A system comprising:

a web application configured to act as an intermediary between desktop applications and an identity server for authenticating users of the desktop applications;

a desktop application configured to:

identify the web application as the intermediary between the desktop application and the identity server;

load a browser control to navigate an internal browser of the desktop application to the web application, wherein the web application redirects the internal browser to the identity server;

submit, via the internal browser, user credentials to authenticate a user of the desktop application to the identity server;

receive, at the internal browser, a cookie comprising an access token for the user of the desktop application;

transmit, to a web application programming interface (API) associated with the web application, an authentication request comprising the access token; and granting access to a resource of the desktop application based on an indication of authentication received from the web API.

12. The system of claim 11, wherein the web application is further configured to facilitate authentication of the user to a second desktop application, wherein the second desktop application is distinct from the desktop application.

13. The system of claim 11, wherein the web API is further configured to:

generate a temporary password to enable offline authentication of the user to the desktop application; and transmit to the desktop application a hash of the temporary password.

14. The system of claim 13, wherein the desktop application is further configured to:

receive the hash of the temporary password generated by the web API; and store the hash of the temporary password on a client device running the desktop application, to enable offline authentication of the user to the desktop application.

15. The system of claim 14, wherein the desktop application is further configured to:

terminate a session between the user and the desktop application;

receive an entered password; and grant access to the resource based on matching the entered password to the hash of the temporary password generated by the web API.

16. The system of claim 11, wherein, to identify the web application as the intermediary between the desktop application and the identity server, the desktop application is further configured to:

request that the web API provide settings related to the identity server; and receive, from the web API, an indication of the web application.

17. The system of claim 11, wherein the desktop application is further configured to:

receive an indication of a security communications protocol for communicating with the identity server; and identifying the web application as having a capability of using the security communications protocol.

18. The system of claim 11, wherein the desktop application is further configured to:

receive an indication that Security Assertion Markup Language (SAML) is used for communications with the identity server; and identify the web application as having a capability of using SAML to communicate with the identity server.

19. The system of claim 18, wherein the web application is further configured to communicate with the identity server using SAML on behalf of the desktop application.

20. The system of claim 19, wherein the desktop application lacks the capability of communicating with SAML.

* * * * *